US007540310B2

(12) United States Patent
Huss

(10) Patent No.: US 7,540,310 B2
(45) Date of Patent: Jun. 2, 2009

(54) CONTINUITY-DETECTING METHOD OF DISPENSING PARTICLES, A PARTICLE FILLING LINE AND APPARATUS FOR DISPENSING PARTICLES

(75) Inventor: Timothy L. Huss, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 534 days.

(21) Appl. No.: 11/247,057

(22) Filed: Oct. 11, 2005

(65) Prior Publication Data

US 2007/0079893 A1 Apr. 12, 2007

(51) Int. Cl.
*B65B 1/04* (2006.01)
*B65B 1/10* (2006.01)
*G01M 1/16* (2006.01)

(52) U.S. Cl. .................. 141/129; 141/94; 141/256; 222/236; 73/455; 73/462

(58) Field of Classification Search ................ 141/256, 141/94, 98, 129, 155; 222/241, 52, 192, 222/236, 459; 73/455, 462, 865.8; 324/71.1
See application file for complete search history.

(56) References Cited

U.S. PATENT DOCUMENTS

| 2,686,618 | A | * | 8/1954 | Mateer | 222/413 |
| 3,191,642 | A | * | 6/1965 | Saito | 141/128 |
| 4,895,274 | A | * | 1/1990 | Morimoto et al. | 222/413 |
| 5,738,153 | A | * | 4/1998 | Gerling et al. | 141/83 |
| 6,347,648 | B1 | * | 2/2002 | Wegman et al. | 141/172 |
| 6,889,722 | B2 | * | 5/2005 | Huss | 141/72 |

* cited by examiner

*Primary Examiner*—Timothy L Maust
*Assistant Examiner*—Nicolas A Arnett
(74) *Attorney, Agent, or Firm*—Gibb I.P. Law Firm, LLC

(57) ABSTRACT

A particle filling line comprises a vertically-oriented conduit that includes a conduit hollow. The conduit includes a conduit top and a conduit bottom. The conduit bottom defines an outlet. The conduit is arranged so that particles supplied to the conduit top flow through the outlet to be received by one or more containers disposed on a movable conveyor belt. The conduit hollow includes one or more conduit hollow elements disposed therein. The one or more conduit hollow elements include any of a plurality of agitators and an auger. The particle filling line is arranged for determining a resistance that is based on the spacing between the one or more conduit hollow elements and the conduit inner walls. When the resistance is determined to be less than a threshold resistance value, the particle filling process ceases.

27 Claims, 1 Drawing Sheet

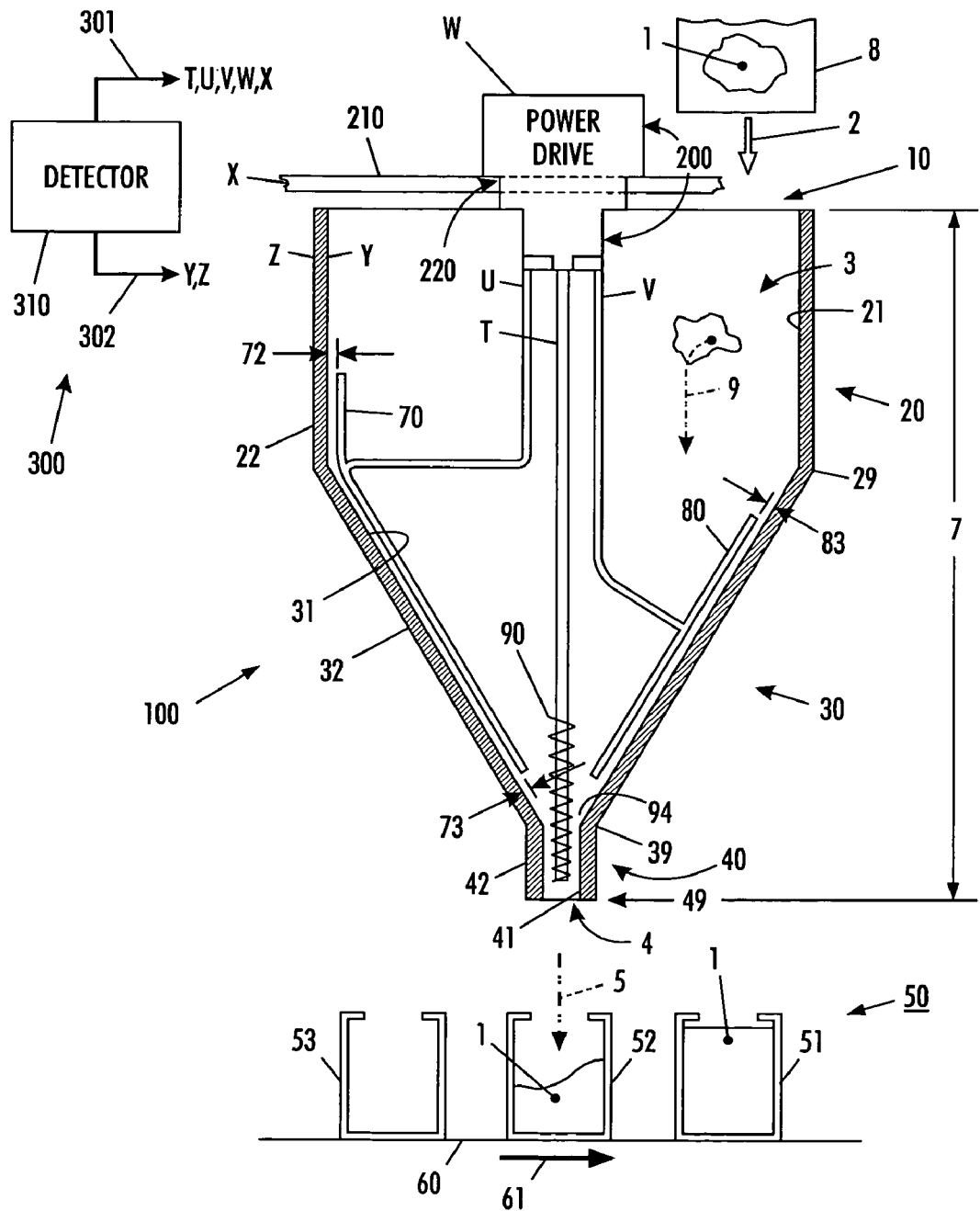

US 7,540,310 B2

CONTINUITY-DETECTING METHOD OF DISPENSING PARTICLES, A PARTICLE FILLING LINE AND APPARATUS FOR DISPENSING PARTICLES

INCORPORATION BY REFERENCE OF A U.S. PATENT

The disclosure of the following U.S. Patent hereby is incorporated by reference, verbatim, and with the same effect as though the same disclosure were fully and completely set forth herein: U.S. Pat. No. 6,889,722 B2, "Method of dispensing particles, a particle filling line, and apparatus for dispensing particles", issued 10 May 2005 to Timothy L. Huss, the same individual as the present applicant, which patent is assigned to Xerox Corporation, the same assignee as in the present application.

BACKGROUND OF THE INVENTION

Any metal-to-metal contact in a toner filler can cause toner to be fused together into a toner flake or large toner particle. This metal-to-metal contact can be caused by improper set-up, a bent auger or equipment wear and tear. For example, this problem recently occurred at a toner plant where a bent auger that wasn't noticed caused toner flakes over a period of time that resulted in many customer complaints. Also, as a result of this problem, a substantial quantity of finished product is required to be scrapped or reworked. Auger and agitator contact to the funnel and hopper walls can happen intermittently due to the density variations of the material causing the agitator to flex outward, putting lateral forces on the auger shaft, or both. Setting up auger alignment on filler systems is a tedious task and is difficult to verify.

Thus, there is a need for the present invention.

BRIEF SUMMARY OF THE INVENTION

In a first aspect of the invention, there is described a method of dispensing particles, the method comprising providing a vertically-oriented conduit having a conduit hollow, a conduit top and a conduit bottom, the conduit bottom defining an outlet; the conduit arranged so that particles supplied to the conduit top flow through the outlet; the conduit hollow including one or more conduit hollow elements disposed therein; the method further comprising (a) filling the conduit hollow with particles; (b) flowing the particles through the outlet to be received by one or more included containers; and (c) determining a resistance that is based on the spacing between the one or more conduit hollow elements and the included conduit inner walls.

In a second aspect of the invention, there is described a particle filling line comprising a vertically-oriented conduit having a conduit hollow, a conduit top and a conduit bottom, the conduit bottom defining an outlet; the conduit arranged so that particles supplied to the conduit top flow through the outlet; the conduit hollow including one or more conduit hollow elements disposed therein; the particle filling line arranged to fill one or more included containers with particles in accordance with a method comprising (a) filling the conduit hollow with particles; (b) flowing the particles through the outlet to be received by the one or more containers disposed on an included movable conveyor belt; and (c) determining when a resistance that is based on the spacing between the one or more conduit hollow elements and the included conduit inner walls is less than a threshold resistance value.

In a third aspect of the invention, there is described apparatus for dispensing particles comprising a vertically-oriented conduit having a conduit hollow, a conduit top and a conduit bottom, the conduit bottom defining an outlet; the conduit arranged so that particles supplied to the conduit top flow through the outlet; the conduit hollow including one or more conduit hollow elements disposed therein; the conduit being arranged with an included means for determining a resistance that is based on the spacing between the one or more conduit hollow elements and the included conduit inner walls.

BRIEF DESCRIPTION OF THE DRAWING

The drawing depicts a particle filling line comprising a vertically-oriented conduit 100. As shown, the conduit 100 includes a conduit hollow 3, a conduit top 10 and a conduit bottom 49. In turn, the conduit bottom 49 defines a conduit outlet 4. The conduit hollow 3 includes one or more conduit hollow elements 70, 80, 90 disposed therein. The one or more conduit hollow elements 70, 80, 90 comprise any of a plurality of agitators 70, 80 and an auger 90. As shown, the conduit is arranged with an included resistance determining means 300. In turn, the resistance determining means 300 comprises a detector 310, a first detector path 301 and a second detector path 302. Also shown are one or more included containers 50 disposed on an included movable 61 conveyor belt 60.

DETAILED DESCRIPTION OF THE INVENTION

Briefly, a particle filling line comprises a vertically-oriented conduit that includes a conduit hollow. The conduit includes a conduit top and a conduit bottom. The conduit bottom defines an outlet. The conduit is arranged so that particles supplied to the conduit top flow through the outlet to be received by one or more included containers disposed on a movable conveyor belt. The conduit hollow includes one or more conduit hollow elements disposed therein. The one or more conduit hollow elements include any of a plurality of agitators and an auger. The particle filling line is arranged for determining a resistance that is based on the spacing between the one or more conduit hollow elements and the conduit inner walls. When the resistance is determined to be less than a threshold resistance value, the particle filling process ceases.

Referring now to the drawing there is depicted a particle filling line comprising a vertically-oriented conduit 100. As shown, the conduit 100 includes a conduit hollow 3, a conduit top 10 and a conduit bottom 49. In turn, the conduit bottom 49 defines a conduit outlet 4.

As shown, in one embodiment the conduit 100 includes an upper cylindrical portion 20, a middle conical portion 30, and a lower cylindrical portion 40. This lower cylindrical portion 40 is also commonly known and referred to as a "funnel".

As depicted in the drawing, the conduit 100 is arranged so that particles 1 supplied 2 to the conduit top 10 flow in a downward direction 9 through the conduit hollow 3. Ultimately the particles 1 exit the conduit 100 through the conduit outlet 4.

As shown, the conduit hollow 3 includes one or more conduit hollow elements disposed therein, where the one or more conduit hollow elements comprise any of the depicted first agitator 70, second agitator 80 and auger 90.

Still referring to the drawing, the particle filling line is arranged to fill one or more included containers 50 with particles 1 in accordance with a method. The method comprises (a) filling 2 the conduit hollow 3 with particles 1; (b) flowing the particles 1 through the outlet 4 to be received 5 by the one or more included containers 50 disposed on an included movable 61 conveyor belt 60; and (c) determining, by means of the resistance determining means 300, a resistance that is based on the spacing 72, 73, 83, 94 between the one or more conduit hollow elements 70, 80 and 90 and the included conduit inner walls 21, 31, 41. When the resistance determining means 300 determines that the resistance is less than a threshold resistance value, the particle filling process ceases.

For good understanding, as used herein, the term "resistance" refers to electrical resistance. As is known, electrical resistance is a property of a conductor by virtue of which the passage of electric current is opposed, thereby causing electric energy to be transformed into heat, and equal to the voltage across the conductor divided by the current flowing in the conductor, commonly measured in ohms.

As shown, in one embodiment, the aforementioned spacing between the one or more conduit hollow elements 70, 80, 90 and the included conduit inner walls 21, 31, 41 comprises at least the following four (4) depicted spacings: a first spacing 72 between the first agitator 70 and the conduit inner wall 21; a second spacing 73 between the first agitator 70 and the conduit inner wall 31; a third spacing 83 between the second agitator and the conduit inner wall 31; and a fourth spacing 94 between the auger 90 and the conduit inner wall 41.

As depicted, the conduit 100 is arranged with an included resistance determining means 300. In turn, the resistance determining means 300 comprises a detector 310, a first detector path 301 and a second detector path 302.

As shown, in one embodiment the one or more conduit hollow elements comprise any of the first agitator 70, the second agitator 80 and the auger 90.

In another embodiment, the one or more conduit hollow elements comprise any one element of the first agitator 70, the second agitator 80 and the auger 90.

In a further embodiment, the one or more conduit hollow elements comprise any two elements of the first agitator 70, the second agitator 80 and the auger 90.

In still another embodiment, the one or more conduit hollow elements comprise all three elements of the first agitator 70, the second agitator 80 and the auger 90.

In one embodiment the method includes, based on the resistance determining means 300 determining that the resistance is less than a threshold resistance value, ceasing the flow of particles 1 through the outlet 4 to be received 5 by the one or more containers 50.

Still referring to the drawing, in a first embodiment the one or more conduit hollow elements 70, 80, 90 and the conduit 100 are comprised of a conductive material and the method includes determining, by the resistance determining means 300, when the resistance between any of the one or more conduit hollow elements 70, 80, 90 and any of the conduit inner walls 21, 31, 41 is less than a threshold resistance value.

In one application of the foregoing first embodiment, for example, the first detector path 301 is coupled to any of the depicted contact points labeled "U", "V" and "T" and the second detector path 302 is coupled to the depicted contact point labeled "Y". As shown in the drawing, the contact points U, V and T respectively correspond to the first agitator 70, the second agitator 80 and the auger 90; and the contact point Y corresponds to the conduit inner wall 21.

Referring still to the drawing, in a second embodiment the one or more conduit hollow elements 70, 80, 90 are coupled to an included power drive 200; the one or more conduit hollow elements 70, 80, 90, the power drive 200 and the conduit 100 are comprised of a conductive material; and the method includes determining, by resistance determining means 300, when the resistance between the power drive 200 and any of the included conduit outer walls 22, 32, 42 is less than a threshold resistance value.

In one application of the foregoing second embodiment, for example, the first detector path 301 is coupled to the depicted contact point labeled "W" and the second detector path 302 is coupled to the depicted contact point labeled "Z". As shown in the drawing, the contact point W corresponds to the power drive 200 and the contact point Z corresponds to the conduit outer wall 22.

Still referring to the drawing, in a third embodiment the one or more conduit hollow elements 70, 80, 90 are coupled to an included power drive housing 210; the one or more conduit hollow elements 70, 80, 90, the power drive housing 210 and the conduit 100 are comprised of a conductive material; and the method includes determining, by the resistance determining means 300, when the resistance between the power drive housing 210 and any of the included conduit outer walls 22, 32, 42 is less than a threshold resistance value.

In one application of the foregoing third embodiment, for example, the first detector path 301 is coupled to the depicted contact point labeled "X" and the second detector path 302 is coupled to the contact point Z. As shown in the drawing, the contact point X corresponds to the power drive housing 210 and the contact point Z corresponds to the conduit outer wall 22.

In one embodiment the particles 1 comprise toner.

In one embodiment the threshold resistance value is 10 ohms.

Thus, there is described the first embodiment, namely, a method of dispensing particles 1, the method comprising providing a vertically-oriented conduit 100 having a conduit hollow 3, a conduit top 10 and a conduit bottom 49, the conduit bottom 49 defining an outlet 4; the conduit 100 arranged so that particles 1 supplied 2 to the conduit top 10 flow 9 through the outlet 4; the conduit hollow 3 including one or more conduit hollow elements disposed therein; the method further comprising (a) filling 2 the conduit hollow 3 with particles 1; (b) flowing the particles 1 through the outlet 4 to be received 5 by one or more included containers 50; and (c) determining, by the included resistance determining means 300, a resistance that is based on the spacing 72, 73, 83, 94 between the one or more conduit hollow elements and the included conduit inner walls 21, 31, 41.

The following eight (8) sentences labeled A through H apply to the foregoing first aspect of the invention:

A. In one embodiment the one or more conduit hollow elements comprise a first agitator 70, a second agitator 80 and an auger 90.

B. In one embodiment the method includes, based on the resistance determining means 300 determining that the resistance is less than a threshold resistance value, ceasing the flow of 1 through the outlet 4 to be received 5 by the one or more containers 50.

C. In one embodiment the one or more conduit hollow elements 70, 80, 90 and the conduit 100 are comprised of a conductive material; and the method includes determining, by the resistance determining means 300, when the resistance between any of the one or more conduit hollow elements 70, 80, 90 and any of the conduit inner walls 21, 31, 41 is less than a threshold resistance value.

D. In one embodiment the one or more conduit hollow elements 70, 80, 90 are coupled to an included power drive 200; the one or more conduit hollow elements 70, 80, 90, the power drive 200 and the conduit 100 are comprised of a conductive material; and the method includes determining, by the resistance determining means 300, when the resistance between the power drive 200 and any of the included conduit outer walls 22, 32, 42 is less than a threshold resistance value.

E. In one embodiment the one or more conduit hollow elements 70, 80, 90 are coupled to an included power drive housing 210; the one or more conduit hollow elements 70, 80, 90, the power drive housing 210 and the conduit 100 are comprised of a conductive material; and the method includes determining, by the resistance determining means 300, when the resistance between the power drive housing 210 and any of the included conduit outer walls 22, 32, 42 is less than a threshold resistance value.

F. In one embodiment the particles 1 comprise toner.

G. In one embodiment the threshold resistance value is 10 ohms.

H. In one embodiment the method comprises detecting a metal-to-metal continuity between the conduit 100 and the one or more conduit hollow elements 70, 80, 90.

Also, there is described the second aspect of the invention, namely, a particle filling line (as depicted in the drawing) comprising a vertically-oriented conduit 100 having a conduit hollow 3, a conduit top 10 and a conduit bottom 49, the conduit bottom 49 defining an outlet 4; the conduit 100 arranged so that particles 1 supplied 2 to the conduit top 10 flow 9 through the outlet 4; the conduit hollow 3 including one or more conduit hollow elements disposed therein; the particle filling line arranged to fill one or more included containers 50 with particles 1 in accordance with a method comprising (a) filling 2 the conduit hollow 3 with particles 1; (b) flowing the particles 1 through the outlet 4 to be received 5 by the one or more containers 50 disposed on an included movable 61 conveyor belt 60; and (c) determining, by the included resistance determining means 300, when a resistance that is based on the spacing 72, 73, 83, 94 between the one or more conduit hollow elements and the included conduit inner walls 21, 31, 41 is less than a threshold resistance value.

The following six (6) sentences labeled I through N apply to the foregoing second aspect of the invention:

I. In one embodiment the one or more conduit hollow elements comprise a first agitator 70, a second agitator 80 and an auger 90.

J. In one embodiment the one or more conduit hollow elements 70, 80, 90 and the conduit 100 are comprised of a conductive material; and the resistance is determined, by the resistance determining means 300, between any of the one or more conduit hollow elements 70, 80, 90 and any of the conduit inner walls 21, 31, 41.

K. In one embodiment the one or more conduit hollow elements 70, 80, 90 are coupled to an included power drive 200; the one or more conduit hollow elements 70, 80, 90, the power drive 200 and the conduit 100 are comprised of a conductive material; and the resistance is determined, by the resistance determining means 300, between the power drive 200 and any of the included conduit outer walls 22, 32, 42.

L. In one embodiment the one or more conduit hollow elements 70, 80, 90 are coupled to an included power drive housing 210; the one or more conduit hollow elements 70, 80, 90, the power drive housing 210 and the conduit 100 are comprised of a conductive material; and the resistance is determined, by the resistance determining means 300, between the power drive housing 210 and any of the included conduit outer walls 22, 32, 42.

M. In one embodiment the particles 1 comprise toner.

N. In one embodiment the threshold resistance value is 10 ohms.

Also, there is described the third embodiment, namely, apparatus for dispensing particles 1 comprising a vertically-oriented conduit 100 having a conduit hollow 3, a conduit top 10 and a conduit bottom 49, the conduit bottom 49 defining an outlet 4; the conduit 100 arranged so that particles 1 supplied 2 to the conduit top 10 flow 9 through the outlet 4; the conduit hollow 3 including one or more conduit hollow elements disposed therein; the conduit 100 being arranged with the resistance determining means 300 for determining a resistance that is based on the spacing 72, 73, 83, 94 between the one or more conduit hollow elements and the included conduit inner walls 21, 31, 41.

The following six (6) sentences labeled O through T apply to the foregoing third aspect of the invention:

O. In one embodiment the one or more conduit hollow elements comprise a first agitator 70, a second agitator 80 and an auger 90.

P. In one embodiment the one or more conduit hollow elements 70, 80, 90 and the conduit 100 are comprised of a conductive material and the resistance determining means 300 determines when the resistance between any of the one or more conduit hollow elements 70, 80, 90 and any of the conduit inner walls 21, 31, 41 is less than a threshold resistance value.

Q. In one embodiment the one or more conduit hollow elements 70, 80, 90 are coupled to an included power drive 200; the one or more conduit hollow elements 70, 80, 90, the power drive 200 and the conduit 100 are comprised of a conductive material; and the resistance determining means 300 determines when the resistance between the power drive 200 and any of the included conduit outer walls 22, 32, 42 is less than a threshold resistance value.

R. In one embodiment the one or more conduit hollow elements 70, 80, 90 are coupled to an included power drive housing 210; the one or more conduit hollow elements 70, 80, 90, the power drive housing 210 and the conduit 100 are comprised of a conductive material; and the resistance determining means 300 determines when the resistance between the power drive housing 210 and the included conduit outer walls 22, 32, 42 is less than a threshold resistance value.

S. In one embodiment the particles 1 comprise toner.

T. In one embodiment the threshold resistance value is 10 ohms.

In summary, this invention uses a continuity check between the rotating auger and agitators and the stationary fill hopper and funnel walls. The continuity tester can be tied in to the filler controls so if any metal-to-metal contact is made by the agitator or auger, the filling equipment will shut down and an alarm message displayed. To enable the continuity test from a technical aspect, the agitators, auger, auger coupling, quill/bearing assembly, and power drive motors are all bonded (or of the same potential by metal-to-metal fasteners) but are isolated (insulated) from the fill hopper, funnel and the rest of the filler system. This bonding from the filler/funnel and the auger/agitator are brought back to two separate ground or earth points. The tiny amount of power used in the continuity tester cannot transfer between the two ground or earth points but will easily be triggered by any metal-to-metal contact between the filler/funnel and the auger/agitator.

For good understanding, the aforementioned two separate ground or earth points are not expressly included in the drawing.

In one embodiment, for the auger/agitator to form metal-to-metal contact with the filler/funnel, the continuity test is based on determining that the electrical path from the auger/agitator to the filler/funnel comprises a resistance of less than ten (10) ohms. Hence, the metal-to-metal continuity determination is based on determining when the resistance between the auger/agitator and the filler/funnel is less than a threshold resistance value of ten (10) ohms. Based on Ohm's Law, this equates to a current range of from 5 to 50 milli-Amperes ("mA"), with a corresponding voltage range of less than 500 milli-Volts ("mV"), or 0.5 Volts.

In one embodiment, an intrinsically safe continuity test system for hazardous areas including gases is used.

Hence, a particle filling line as depicted in the drawing comprises a vertically-oriented conduit 100 that includes a conduit hollow 3. The conduit 100 includes a conduit top 10 and a conduit bottom 49. The conduit bottom 49 defines a conduit outlet 4. The conduit 100 is arranged so that particles 1 supplied 2 to the conduit top 10 flow 9 in a downward direction through the outlet 4 to be received 5 by one or more included containers 50 disposed on a movable 61 conveyor belt 60. The conduit hollow 3 includes one or more conduit hollow elements disposed therein. The one or more conduit hollow elements include any of a plurality of agitators 70, 80 and an auger 90. The particle filling line is arranged with means 300 for determining a resistance that is based on the spacing 72, 73, 83 and 94 between the one or more conduit hollow elements 70, 80, 90 and the conduit inner walls 21, 31, 41. When the resistance is determined to be less than a threshold resistance value, the particle filling process ceases.

The table below lists the drawing element reference numbers together with their corresponding written description:

Ref. No.: Description:
1 particles
2 particles being supplied to the conduit
3 conduit hollow
4 conduit outlet
5 particles being dispensed from the conduit
7 conduit height
8 particle source
9 flow of particles in conduit
10 conduit top
20 conduit upper cylindrical portion
21 conduit upper cylindrical portion inner wall
22 conduit upper cylindrical portion outer wall
29 junction of conduit upper cylindrical and conical portions
30 conduit conical portion
31 conduit conical portion inner wall
32 conduit conical portion outer wall
39 junction of conduit conical and lower cylindrical portions
40 conduit lower cylindrical (funnel) portion
41 conduit lower cylindrical (funnel) portion inner wall
42 conduit lower cylindrical (funnel) portion outer wall
49 conduit bottom
50,51
52,53 containers
60 conveyor belt
61 direction of conveyor belt
70 first agitator
72 spacing between first agitator and conduit inner wall 21
73 spacing between first agitator and conduit inner wall 31
80 second agitator
83 spacing between second agitator and conduit inner wall 31
90 auger
94 spacing between auger and conduit inner wall 41
100 conduit
200 agitator and auger power drive
210 agitator and auger power drive housing
220 power drive-housing electrical contact point(s)
300 resistance determining means
301 first detector path
302 second detector path
310 detector While various embodiments of a continuity-detecting method of dispensing particles, a particle filling line and apparatus for dispensing particles, in accordance with the present invention, are described above, the scope of the invention is defined by the following claims.

What is claimed is:

1. A particle filling line comprising:
   a vertically-oriented conduit having a conduit hollow, a conduit top and a conduit bottom,
   the conduit bottom defining an outlet, the conduit being arranged so that particles supplied to the conduit top flow through the outlet;
   a plurality of conduit hollow elements disposed within said conduit;
   a detector electrically connected to said conduit and separately electrically connected to said conduit hollow elements;
   a plurality of first electrical contact points electrically connecting said detector and said conduit; and
   a plurality of second electrical contact points electrically connecting said detector and said conduit hollow elements,
   the particle filling line being arranged to fill one or more included containers with particles in accordance with a method comprising:
   (a) filling the conduit hollow with particles;
   (b) flowing the particles through the outlet to be received by the one or more containers disposed on an included movable conveyor belt; and
   (c) determining when a resistance that is based on the spacing between the conduit hollow elements and the included conduit inner walls is less than a threshold resistance value, using said detector.

2. The particle filling line of claim 1, where the conduit hollow elements comprise a first agitator, a second agitator and an auger.

3. The particle filling line of claim 1 where the conduit hollow elements and the conduit are comprised of a conductive material; and the resistance is determined between any of the conduit hollow elements and any of the conduit inner walls.

4. The particle filling line of claim 3, the particles comprising toner.

5. The particle filling line of claim 1 where the conduit hollow elements are coupled to an included power drive; the conduit hollow elements, the power drive and the conduit are comprised of a conductive material; and the resistance is determined between the power drive and any of the included conduit outer walls.

6. The particle filling line of claim 5, where the conduit hollow elements comprise a first agitator, a second agitator and an auger.

7. The particle filling line of claim 5, the particles comprising toner.

8. The particle filling line of claim 1 where the conduit hollow elements are coupled to an included power drive housing; the conduit hollow elements, the power drive housing and the conduit are comprised of a conductive material; and the resistance is determined between the power drive housing and any of the included conduit outer walls.

9. The particle filling line of claim 8, where the conduit hollow elements comprise a first agitator, a second agitator and an auger.

10. The particle filling line of claim 8, the particles comprising toner.

11. The particle filling line of claim 8, the threshold resistance value being 10 ohms.

12. Apparatus for dispensing particles comprising:
a vertically-oriented conduit having a conduit hollow, a conduit top and a conduit bottom, the conduit bottom defining an outlet, the conduit being arranged so that particles supplied to the conduit top flow through the outlet;
a plurality of conduit hollow elements disposed within said conduit;
a detector electrically connected to said conduit and separately electrically connected to said conduit hollow elements, said detector determining a resistance that is based on the spacing between the conduit hollow elements and the included conduit inner walls;
a plurality of first electrical contact points electrically connecting said detector and said conduit; and
a plurality of second electrical contact points electrically connecting said detector and said conduit hollow elements.

13. The apparatus of claim 12, where the conduit hollow elements comprise a first agitator, a second agitator and an auger.

14. The apparatus of claim 12 where the conduit hollow elements and the conduit are comprised of a conductive material; and the detector is arranged to determine when the resistance between any of the conduit hollow elements and any of the conduit inner walls is less than a threshold resistance value.

15. The apparatus of claim 12 where the conduit hollow elements are coupled to an included power drive; the conduit hollow elements, the power drive and the conduit are comprised of a conductive material; and the detector is arranged to determine when the resistance between the power drive and any of the included conduit outer walls is less than a threshold resistance value.

16. The apparatus of claim 15, where the conduit hollow elements comprise a first agitator, a second agitator and an auger.

17. The apparatus of claim 15, where the particles comprise toner.

18. The apparatus of claim 15, where the threshold resistance value is 10 ohms.

19. The apparatus of claim 12 where the conduit hollow elements are coupled to an included power drive housing; the conduit hollow elements, the power drive housing and the conduit are comprised of a conductive material; and the detector is arranged to determine when the resistance between the power drive housing and the included conduit outer walls is less than a threshold resistance value.

20. The apparatus of claim 19, where the conduit hollow elements comprise a first agitator, a second agitator and an auger.

21. The apparatus of claim 19, where the particles comprise toner.

22. The apparatus of claim 19, the threshold resistance value being 10 ohms.

23. An apparatus comprising:
a vertically-oriented conduit having conduit inner walls;
a plurality of conduit hollow elements disposed within said conduit;
a detector electrically connected to said conduit and separately electrically connected to said conduit hollow elements, said detector determining a resistance that is based on spacings between said conduit hollow elements and said conduit inner walls;
a plurality of first electrical contact points electrically connecting said detector and said conduit; and
a plurality of second electrical contact points electrically connecting said detector and said conduit elements.

24. The apparatus of claim 23, said conduit hollow elements being coupled to an included power drive housing; said conduit hollow elements, said power drive housing and said conduit comprising a conductive material; and said detector being arranged to determine when a resistance between said power drive housing and conduit outer walls is less than a threshold resistance value.

25. The apparatus of claim 23, said conduit hollow elements comprising a first agitator, a second agitator and an auger.

26. The apparatus of claim 23, said particles comprising toner.

27. The apparatus of claim 23, said threshold resistance value being 10 ohms.

* * * * *